Nov. 6, 1928.                                   1,690,216
E. W. DAVIS
COUPLING
Filed May 12, 1927
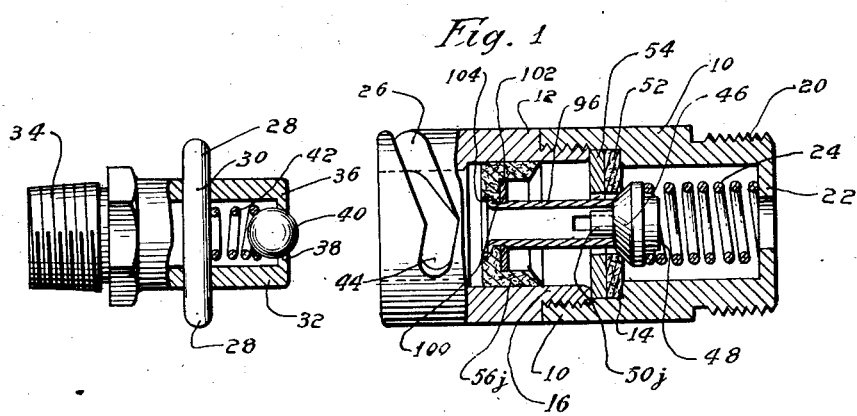
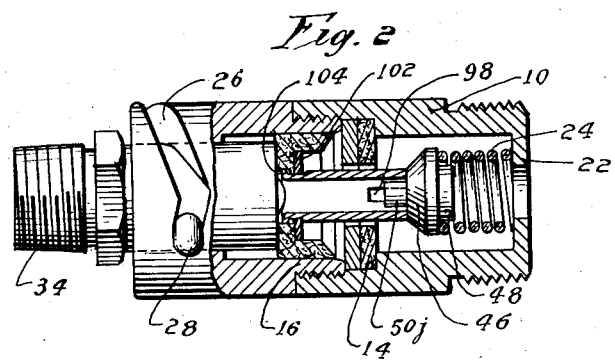
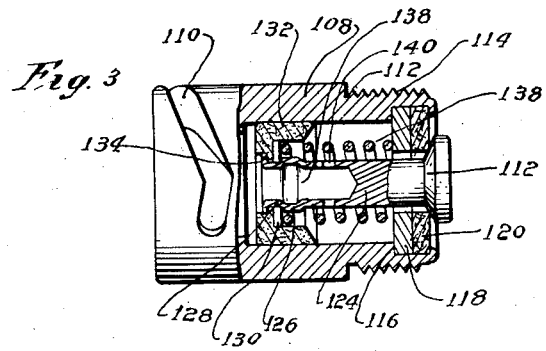
Inventor:
Ernest W. Davis
By: Williams, Bradbury,
McCaleb & Hinkle
Atty's.

Patented Nov. 6, 1928.

1,690,216

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

COUPLING.

Application filed May 12, 1927. Serial No. 190,695.

My invention relates to lubrication and more specifically to an improved coupling for connecting the discharge tube, or opening, of a source of lubricant under pressure, to means fixed on the bearing or machine member, to be lubricated, for receiving such lubricant under pressure.

This application is a continuation in part of my co-pending application, Serial No. 95,688, filed March 18, 1926 for coupling.

Among the objects and advantages of the invention may be enumerated:

First, the simplification and standardization of the constructural embodiment of the coupling;

Second, increased ease in replacement and maintenance; and

Third, greater certainty in operation.

The problem involved is unique on account of the small volume to be handled, the relatively wide range and high upper limit of the pressures to be carried, and the unusually objectionable features from a service standpoint of even a very slight leakage. Thus a relatively small quantity of lubricant is all that need be injected at each lubrication into an ordinary bearing, and a moderate pressure is often sufficient but the equipment employed is usually capable of generating relatively high pressures of the order of magnitude of 1,000 pounds per square inch or more, for forcing the lubricant positively into places clogged with dirt or old lubricant, and such high pressures are required at frequent intervals in service. Furthermore, a very slight leak soon soils the parts and destroys one of the main advantages rendering lubricating systems of the type involved superior to ordinary grease cups, viz cleanliness.

In the accompanying drawings:

Fig. 1 is a central section through a complete coupling showing the two members thereof in separated relation;

Fig. 2 is a similar view to Fig. 1 showing the members in coupled relation; and

Fig. 3 is a central section of a modified form of female coupling member.

In the embodiment shown in Figs. 1 and 2, the female coupling member comprises two sleeves, a rear, or inlet sleeve 10, and a front, or discharge sleeve 12. The two sleeves are of uniform outer configuration and identical diameter, so that they appear in use as a single element. On the inside, one of the sleeves is enlarged as at 14 to form a shoulder and the threaded end 16 on the other sleeve engages the threads 18 on the first sleeve to fasten the parts together. The channel thus formed between the end portions 16 and the opposing shoulder receives and clamps in place a suitable seat for the valve.

The rear sleeve is threaded at 20 for attachment to the discharge opening of a grease gun or the end of a suitable conduit for conveying lubricant under pressure into the coupling. Its rear end is also provided with an inwardly extending flange 22 forming a seat for the valve spring 24.

The front sleeve is provided with a pair of bayonet slots 26 for receiving the projecting ends 28 of a pin 30 passing transversely through the tubular body 32 of a male coupling member, commonly referred to by the trade as a "fitting". The fitting has a threaded tubular end portion 34 for attaching the same to a bearing, or the like, a smooth contact face 36 at its receiving end for forming a lubricant seal, and a shoulder at 38 forming a valve seat. The ball check valve 40 is held against the seat 38 by a suitable spring 42.

The slots 26 have been illustrated in this instance with a return pocket or reversely inclined inner end portion 44, tending to retain the parts in coupled position.

In the embodiment of the invention illustrated in Figs. 1 and 2, the valve comprises a valve member proper 46 carrying a stud 48 for centering the spring 24, and having a stub stem 50ᴶ projecting outwardly through the valve seat and adapted to receive a sleeve 96. The valve proper 46 seats on an annular ring 52 of rubber, fibre, or other suitable material for forming a tight seal reinforced by a metal ring 54 both clamped in place by assembling the front and rear sleeves.

The outer end of the sleeve 96 is reduced as at 100 to receive a metal washer 102 and a cup leather 56ᴶ, the cup leather and washer being held in place by the turned-over end 104 of the sleeve. The cup leather 58 is kept in sealing contact with the face 36 of the fitting by the tension of the valve spring 24 transmitted to the face of the gasket through the valve 46, sleeve 96, and washer 102, and, when the lubricant under pressure is passing through the assembled coupling, by the pressure of the lubricant which acts not only against the face of the cup leather, but against the cylindrical portion, which is thereby expanded tightly against the bore of the outer sleeve. A transverse slot 98 establishes communication between the inside of the discharge sleeve and the bore of the fitting.

When the fitting is removed from the position shown in Fig. 1, the valve 46 will move down onto its seat, and simultaneously with such seating the forward movement of the cup leather ceases as the seating of the valve prevents the spring 24 from exerting any further outward force on the cup leather.

It will be apparent that in this embodiment of the invention, the assembled female coupling member is a self-contained unitary structure of convenient and serviceable shape, but that disconnecting the front and rear sleeves by unscrewing them will let the metal ring 54, the valve seat 52, the valve and its stem 50, the spring 24, the cup leather 58¹, and the washer 102, all fall apart into as many separate pieces. Thus, any or all of the parts which may have been worn by usage, or damaged by the insertion into the coupling member of tools not intended for such use, may readily be replaced, or repaired, and all the "insides" stacked together again and reassembled by threading the sleeves together.

In Fig. 3 of the drawing I have illustrated a modified form of female coupling member which is likewise a unitary structure but which is even simpler and more economical to manufacture than that previously described, and which has the further advantage of increased compactness. In this form of the invention, the female coupling member has a single sleeve 108 having bayonet slots 110 at its outlet and for effecting a rigid connection with a lubricant receiving fitting. At its inlet end, the sleeve 108 is reduced in diameter as at 112 and provided with threads 114 for securing said sleeve to the discharge opening of a lubricant compressor or to the terminal part of a discharge conduit supplied with lubricant under pressure by any well known means.

The sleeve 108 is provided near its inlet end with an interior shoulder 116 which provides an abutment for a metal gasket 118 which forms a support for a valve seat 120 of leather, fibre or other suitable material, and which is clamped in place by the turned-over end of the sleeve 108. Cooperating with the valve seat 120 is an inwardly opening valve 112 having a stem 124 projecting outwardly through the valve seat and having an enlarged portion 126 followed by a reduced portion 128 on which are mounted a metal washer 130 and a cup leather 132 for effecting in seal with a lubricant receiving fitting. The enlarged portion 126 provides a shoulder against which the metal washer 130 abuts and said washer and the cup leather 132 are clamped in place by a turned over end 134 of the stem 124. A spring 138 normally maintains the valve 122 on its seat and also serves to effect an initial seal between the cup leather and the end of the lubricant receiving fitting. This initial seal is reinforced by the pressure of the lubricant acting on the inner side of the washer 130 and the cup leather 132. Communication between the bore of the fitting and the interior of the sleeve 108 is established through the axial passage 138 and the cross passage 140, both of which are formed in the valve stem 124.

Having thus illustrated and described preferred forms of my invention, what I claim and desire to secure by United States Letters Patent is:

1. A female coupling member of the class described comprising, in combination, a sleeve having bayonet slots at its outlet end and a reduced threaded portion at its inlet end, a valve seat at said inlet end, a valve for said seat, a spring for normally maintaining said valve in closed position, spacing means extending from said valve outwardly through said valve seat, said means presenting a shoulder and a portion of reduced cross-section adjacent said shoulder, a metal washer and a cup leather mounted on said reduced portion and clamped against said shoulder by the turned-over end of said reduced portion, said cup leather serving to effect a lubricant tight seal with a male coupling element having a passage therethrough, said spring serving to press said cup leather against a male coupling element, and axial and lateral passages in said means for connecting the passage in a male coupling element with the interior of said sleeve.

2. A female coupling element comprising, in combination, a single sleeve having an outlet end provided with bayonet slots for interlocking with parts carried by a male coupling element and an inlet end of reduced diameter and provided with screw-threads, a shoulder adjacent the inlet end of said sleeve, a ring-like metal washer adjacent said shoulder, a ring-like valve, seat supported by said washer, the inlet end of said sleeve being turned over to clamp said washer and valve seat against said shoulder, a valve for said seat, a valve stem extending through said seat to a point adjacent the outlet end of said sleeve, said valve stem having a reduced end portion terminating at a shoulder, a ring-like metal washer on said reduced portion and adjacent said shoulder, a cup leather clamped against said washer by a turned-over part of said stem, a passage in said stem for connecting a male coupling element with the interior of said sleeve, and a spring confined between said valve seat and said cup leather.

3. A unitary female coupling member of the class described comprising, in combination, a single sleeve having an outlet end provided with means for effecting a connection with a complementary coupling member and an inlet end provided with a shoulder, a valve seat supported by said shoulder, a valve for said seat having a stem projecting outwardly through said seat, sealing means mounted on the outlet end of said valve stem, and means confined between said valve seat and sealing means for closing said valve and effecting a seal between said sealing means and a complementary coupling member.

4. A female coupling element of the class described comprising, in combination, a sleeve having an outlet end provided with means for effecting a connection with a complementary coupling member and an inlet end adapted to be connected to means for supplying lubricant under pressure thereto, a shoulder in said sleeve adjacent said outlet end, a valve seat adjacent said inlet end, a valve for said seat having a stem projecting outwardly through said seat, sealing means spaced from said valve and movable therewith, said sealing means including a metal washer and a cup leather clamped against said washer, and a spring for closing said valve.

In witness whereof, I hereunto subscribe my name this 9th day of May, 1927.

ERNEST W. DAVIS.